3,834,941
PROCESS FOR THE PURIFICATION OF SUGAR-
BEET JUICE AND THE REDUCTION OF LIME
SALTS THEREIN
Karlheinz W. R. Schoenrock, Chia-Lung Hsieh, and Hugh
G. Rounds, Ogden, Utah, assignors to The Amalgamated Sugar Company, Ogden, Utah
Filed May 17, 1972, Ser. No. 254,215
Int. Cl. C13d 3/00
U.S. Cl. 127—50                                   6 Claims

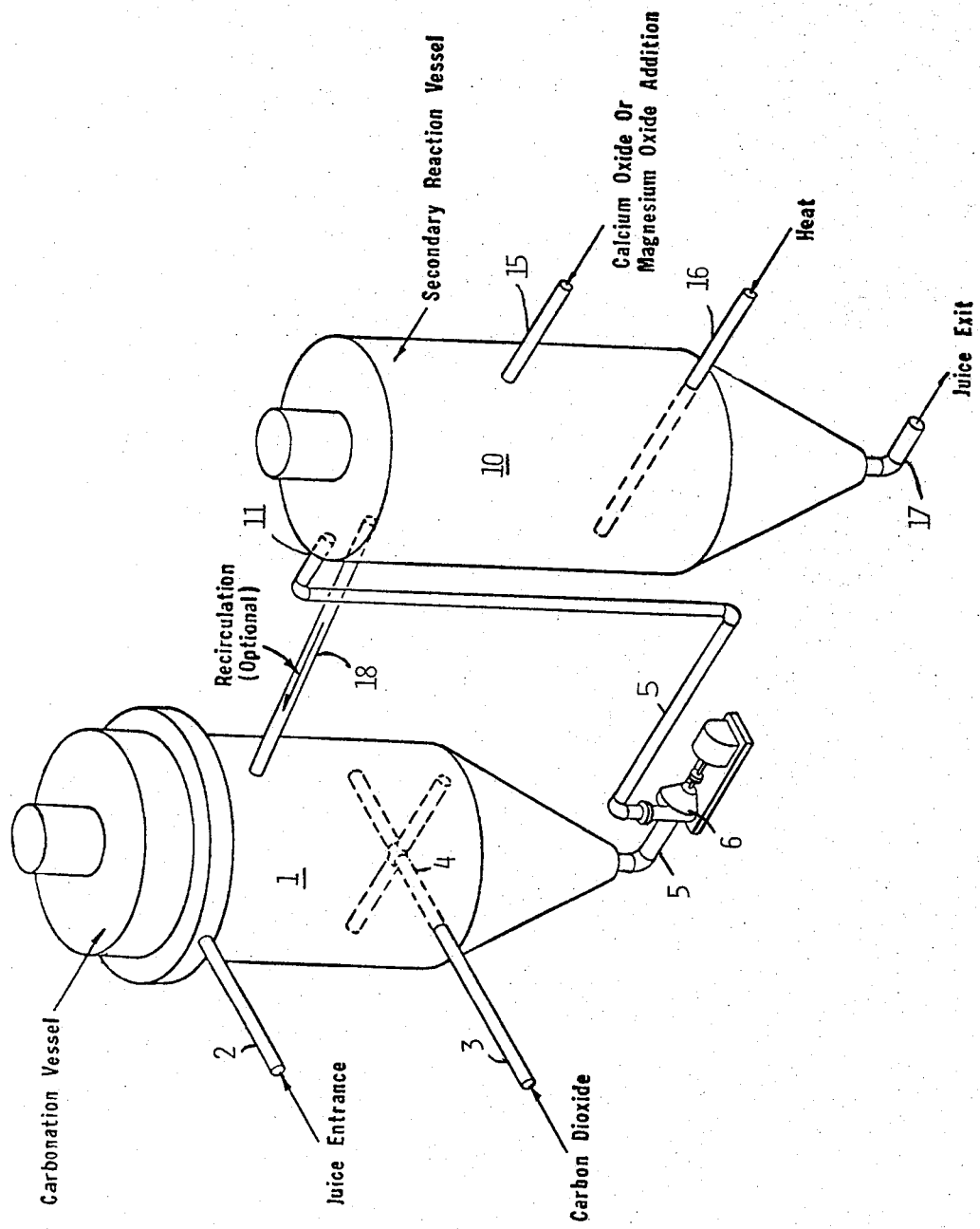

ABSTRACT OF THE DISCLOSURE

Methods of purifying a raw sugar juice involving alkalizing the juice, over-carbonating the juice to reduce the alkalinity to below about 0.065% CaO equivalent and thereafter re-alkalizing with an alkaline earth metal oxide.

---

This invention releates to the art of recovering sugar from sugarbeet juice, and is concerned with the operation of purifying such juice.

In a conventional procedure for purifying sugarbeet juice, lime is added to the juice extracted from the beets, and carbon dioxide is introduced causing the precipitation of calcium carbonate as a mass of fine crystals. This is generally known as "first carbonation" or "first carbonatation." Enough carbon dioxide is added to effect light juice color and ease of separation (filtration or decantation) of the carbonate "mud." This usually takes place in an alkalinity range of .065 to .100% CaO. Purification is accomplished primarily by coagulation, precipitation of insoluble calcium salts and by the adsorption of juice impurities by the fine calcium carbonate crystals, respectively.

In the conventional process this "first carbonation" is followed by a scond carbonation to reduce the remaining lime salts in the juice to a minimum. This is necessary to keep to a minimum the scaling and fouling of the heating surfaces in the evaporators (or concentrators) which require expensive chemical cleaning when dirty. Under normal conditions, however, the lime salts are generally excessive and require a chemical additive which will reduce the lime salts to acceptable limits. Soda ash is usually used for this purpose, but we have discovered how magnesium oxide can be used rather than soda ash for minimizing lime salts, which allows substantial process savings.

A large number of different purification process variations are known and, to a smaller extent, practiced. The major difference amongst these purification processes involving use of lime and carbon dioxide exists in the various steps ahead of the main carbonation and/or final carbonation, respectively. Among these known process variations are:

a. preliming with or without carbonation;
b. separation of prelimed and/or precarbonated sludge;
c. intermediate liming;
d. precarbonation;
e. main liming;
f. main carbonation;
g. defeco-saturation;
h. liming of clarified liquor during final carbonation; and
i. over-carbonation ahead of main liming.

The practice of adding soda ash and/or magnesium oxide immediately ahead of, or directly to, the main carbonation and/or final carbonation vessels, respectively, is also commonly resorted to for facilitating the suppression of calcium salts solubilities.

It has now been discovered that significant improvements in any of the existing purification processes and systems employing lime and carbon dioxide are made possible through the application of a technique heretofore neither known nor practiced.

The novel technique according to this application is predicated upon the observation that a more desirable reaction occurs when small amounts of the oxides of the alkaline earth metals are added after the so-called main carbonation and/or final carbonation steps, respectively, rather than before and/or during the respective carbonation procedures as has been commonly practiced heretofore. This leads to the formation of insoluble calcium carbonate, which is a more effective adsorbant for undesirable impurities, forms a more easily filterable precipitate, and leaves a lower residue of soluble calcium salts in the final juice. Any of the oxides of the alkaline earth metals may be employed in this technique, but the oxide of calcium (CaO) or its respective hydroxide ($Ca(OH)_2$) is preferred as the additive after main carbonation, while the oxide of magnesium (MgO) is preferred as the additive after the final carbonation step.

This reaction proceeds when carried out in two steps, wherein during the first step an excess of carbon dioxide is added to convert prevailing hydroxides to carbonates and/or bicarbonates, respectively. In the second step the mixture thus carbonated is transferred to a secondary reaction vessel where sufficient alkaline earth metal oxides and/or hydroxides are added to raise the alkalinity to the optimum point conductive to maximum juice quality. Where applicable, temperatures are raised preferably in the secondary reaction vessel to complete the destruction of bicarbonates.

Step 1

After pretreatment of the process liquor according to the various techniques and after the addition of the main quantity of the total lime to be added either before or during carbonation, additional carbon dioxide is added to obtain an alkalinity of between 0.01 and 0.065% CaO equivalent, but preferably to about 0.03% CaO equivalent alkalinity in the so-called main carbonation step. The mixture thus carbonated may be recirculated within the carbonation vessel or from the upper section of a required secondary reaction vessel.

Step 2

Additional lime is now added to the contents of the secondary reaction vessel in such a way that the lime thus added cannot enter into the main carbonation vessel. Sufficient lime is added to the secondary reaction vessel so that the final alkalinity of the mixture leaving this reaction vessel will be between 0.065 and 0.15% CaO equivalent but preferably about 0.10% CaO. The secondary reaction vessel after main carbonation must be so designed as to provide at least .5 to 15 minutes (preferably about 5 minutes) reaction time for the lime added to the secondary reaction vessel.

From this point the separation of precipitated solids may proceed as is commonly practiced.

Step 3

During final carbonation, the carbonation is carried to an alkalinity of 0 to 0.015% CaO equivalent alkalinity or to a minimum alkalinity obtainable under prevailing conditions, but preferably to an alkalinity of about 0.01% CaO equivalent.

Step 4

The mixture carbonated according to Step 3 may be taken to a secondary reaction vessel, preferably tangentially to the periphery of the vessel, and the larger portion of the mixture may be returned into the carbonation vessel from the upper section of the secondary reaction vessel to provide seed for CaCO₃ crystallization in the carbonation vessel.

Above description is only one form of allowing recirculation to the carbonation vessel while providing sufficient reaction time for the added alkaline earth metal oxide before final discharge for further processing. It is to be understood that this invention will work with any arrangement as long as there is overcarbonation in the carbonation vessel according to Step 3, addition of the reagent according to Step 5, and sufficient reaction time is provided to allow the reaction to take place before filtration takes place.

Step 5

A slurry of an alkaline earth metal oxide, preferably magnesium oxide, is introduced into the secondary reaction vessel, somewhat below the recirculation discharge, if such is employed, in such a way that the alkaline earth oxides introduced into the secondary reaction vessel cannot enter into the final carbonation vessel but rather continue to travel toward the discharge of the secondary reaction vessel. Where convenient the alkaline earth metal oxide may be added in dry foam.

The secondary reaction vessel must be so designed as to provide at least 5 minutes, but preferably 10 to 15 minutes, retention time for the alkaline earth metal oxide from the point of entrance to the discharge, to complete the reaction.

Step 6

Heat may be applied via steam jets (or, other heating devices may be installed) in the secondary reaction vessel to facilitate a uniform reaction and to decompose all residual bicarbonates. Desirable operation temperatures are in the range 30° to 95° C., but preferably about 80° C. for the main carbonation and between 50° and 100° C., but preferably about 95° C., for the final carbonation.

The application of heat is desirable for maximum benefits but its absence will not negate improvements possible over conventional processes by following instructions given elsewhere in this procedure.

Alternative Step 7

Other anions forming insoluble and/or impurity-absorbing precipitates such as phosphoric acid, oxalic acid, etc., may be used in addition to, or in place of, carbon dioxide.

It will be noticed that in applicants' so-called "first carbonation" they carbonate slightly in excess of what is normally done but not beyond the point of repeptization of impurities or where bicarbonates are formed, e.g., 0.03% CaO. At this point the calcium carbonate thusly formed is relatively inactive with respect to removing impurities via surface absorption and a maximum number of calcium-carbonate particles are formed. Absorptive power is then reactivated with increased activity and surface area, respectively, by raising alkalinity to 0.065–0.15% CaO through a small lime addition.

This invention may find useful application for the purification of beet sugar juice and cane sugar juice as well as for water treatment.

The main benefits derived through the application of this invention are:

a. Increased extraction of sugar
b. Reduced operating cost
c. Increased product quality
d. Reduced evaporator boil out requirements
e. Better heat transfer and increased steam efficiency The invention will now be further described in connection with the appended drawing, in which the single figure is a diagrammatic representation of an an appartus operable for carrying out the process aspect of this invention.

In the drawing: a carbonation vessel 1 is provided with a raw feed conduit 2, a carbon dioxide inlet duct 3 extending to a sparger 4 in the lower part of vessel 1, and a discharge conduit 5 in which a conventional pump means 6 is interposed. A secondary reaction vessel 10 is provided with an inlet orifice 11 adjacent its upper part, into which orifice conduit 5 extends. Vessel 10 is further provided with (a) inlet means 15 for addition of alkaline earth metal oxide (or, hydroxide), (b) a conventional heating means 16, e.g., a steam duct, and (c) an exit means 17 for treated juice. Optionally, vessels 1 and 10 may (as shown) be connected by a recirculation pipe 18.

We claim:

1. In the purification of raw sugar juice involving treating the juice with an alkaline earth metal oxide such as lime and with carbon dioxide and separating precipitated solids from the liquid phase of the treated material whereby the juice is subjected to a so-called first or main carbonation followed by a second or final carbonation, the improvement which comprises substantially over-carbonating an alkaline sugar juice with carbon dioxide to reduce the alkalinity of the juice to a level below about 0.065% CaO equivalent, in the main carbonation step, and thereafter re-alkalizing with alkaline earth metal oxide prior to said separation of precipitated solids.

2. In the purification of a raw sugar juice involving treating the juice with an alkaline earth metal oxide and with carbon dioxide and separating precipitated solids from the liquid phase of the treated material, said treatment with carbon dioxide comprising a main carbonation and a final carbonation, the improvement which comprises over-carbonating the juice to an alkalinity of 0.03–0.065% CaO equivalent for the main carbonation, re-alkalizing to an alkalinity of 0.07–0.15% CaO equivalent with a calcium compound selected from the group consisting of CaO and Ca(OH)₂, thereafter separating precipitated solids from the so-treated juice, and effecting final carbonation.

3. The purification procedure defined in claim 2, wherein the reactants are maintained at a temperature of from 50 to 100° C., during a reaction interval of from 5 to 15 minutes for the final re-alkalizing step.

4. The improved purification procedure defined in claim 2 wherein in the re-alkalization after the main carbonation step the reactants are maintained at a temperature of 50°–90° C. during a reaction interval of from 0.5 to 15 minutes.

5. In the purification of a raw sugar juice involving treating the juice with an alkaline earth metal oxide and with carbon dioxide and separating precipitated solids from the liquid phase of the treated material, said treatment with carbon dioxide comprising a main carbonation and a final carbonation, the improvement which comprises over-carbonating to an alkalinity of 0.0–0.02% CaO equivalent in the final carbonation, re-alkalizing the finally over-carbonated juice to an alkalinity of 0.01–0.03% CaO equivalent with MgO, and thereafter removing precipitated solids from the so-treated juice.

6. In the purification of a raw sugar juice involving treating the juice with an alkaline earth metal oxide and with carbon dioxide and separating precipitated solids from the liquid phase of the treated material, said treatment with carbon dioxide comprising a main carbonation and a final carbonation, the improvement which comprises over-carbonating the juice to an alkalinity of 0.03–0.065% CaO equivalent for the main carbonation, re-alkalizing to an alkalinity of 0.07–0.15% CaO equivalent of juice with a calcium compound selected from the group consisting of CaO and Ca(OH)₂, thereafter separating precipitated solids, over-carbonating the so-treated juice to an alkalinity of 0.0–0.02% CaO equivalent during the final carbonation, and subsequently re-alkalizing the finally over-carbonated juice to an alkalinity of 0.01–0.03% CaO equivalent with MgO followed by final separation of precipitated solids.

References Cited

UNITED STATES PATENTS

| | | | |
|---|---|---|---|
| 2,774,693 | 12/1956 | Brieghel-Muller | 127—50 |
| 2,067,362 | 1/1937 | Stietz | 127—50 X |
| 2,422,699 | 6/1947 | Naugle | 127—50 |
| 2,441,281 | 5/1948 | Naugle | 127—50 |
| 2,697,049 | 12/1954 | Brieghel-Muller | 127—52 X |
| 2,824,028 | 2/1958 | Zenzes | 127—50 |

MORRIS O. WOLK, Primary Examiner

S. MARANTZ, Assistant Examiner

U.S. Cl. X.R.

127—52